US007742585B2

(12) United States Patent
Otaka et al.

(10) Patent No.: US 7,742,585 B2
(45) Date of Patent: Jun. 22, 2010

(54) MOBILE COMMUNICATION TERMINAL

(75) Inventors: Osamu Otaka, Tokyo (JP); Mineko Moroto, Tokyo (JP); Norioki Watanabe, Tokyo (JP); Shinichiro Ide, Chiba (JP); Naomi Nishikata, Shizuoka (JP)

(73) Assignee: Vodafone Group PLC, Newbury, Berkshire (GB)

( * ) Notice: Subject to any disclaimer, the term of this patent is extended or adjusted under 35 U.S.C. 154(b) by 1086 days.

(21) Appl. No.: 10/557,322

(22) PCT Filed: May 18, 2004

(86) PCT No.: PCT/JP2004/006651

§ 371 (c)(1),
(2), (4) Date: Nov. 18, 2005

(87) PCT Pub. No.: WO2004/102932

PCT Pub. Date: Nov. 25, 2004

(65) Prior Publication Data
US 2006/0229106 A1    Oct. 12, 2006

(30) Foreign Application Priority Data
May 19, 2003   (JP)   ............................. 2003-140967

(51) Int. Cl.
*H04M 3/42* (2006.01)
(52) U.S. Cl. ................................. 379/201.1; 455/414.1
(58) Field of Classification Search ............ 379/201.01; 455/414.1
See application file for complete search history.

(56) References Cited

U.S. PATENT DOCUMENTS 6,901,255 B2 * 5/2005 Shostak .................. 455/422.1
(Continued)

FOREIGN PATENT DOCUMENTS

JP   2000-347867   12/2000
(Continued)

OTHER PUBLICATIONS

NTT Docomo Inc., "i Appli Contents Kaihatsu Guide for DoJa-3.0 -Shosaihen-", Dai 1.00 Han, Apr. 17, 1993, http://www.nttdocomo.co.jp/p_s/imode/java/pdf/jguidefordoja3_0_030417.pdf.
(Continued)

*Primary Examiner*—Alexander Jamal
(74) *Attorney, Agent, or Firm*—Muirhead and Saturnelli, LLC

(57) ABSTRACT

A mobile communication terminal is provided whose operability is improved by enabling a user to promptly use a function that the user requires, upon suspension of execution of an application program. A mobile communication terminal (mobile phone) 20 includes an output unit 216 having a liquid crystal display (LCD) 27 that displays an image; a main control unit 215 that controls the output unit 216; and an application program executing and managing unit 214 that executes an application program registered by a user. The application program executing and managing unit 214 sends a function transition request instruction (screen transition request instruction) to make a transition to a function specified by the application program, to the main control unit 215, upon suspension of execution of the application program. Based on the function transition request instruction (screen transition request instruction), the main control unit 215 controls the output unit 216 to display an initial screen of the function or a menu screen for selecting the function.

15 Claims, 11 Drawing Sheets

U.S. PATENT DOCUMENTS

2003/0007012 A1    1/2003    Bate

FOREIGN PATENT DOCUMENTS

JP    2002-152328    5/2002

OTHER PUBLICATIONS

Sekiguchi, Kiyoshi, "Docomo, 505i de Saiyo Sareta i Appli No. Shinshiyo o Kokai," Apr. 21, 2003, Impress, Ketai Watch, http://k-tai.impress.co.jp/cda/article/news_toppage/13676.html.

Siemens, "Manual Siemens S55", Dec. 16, 2002.

Winter, Marie-Anne, "Jetzt im Handel: Siemens S55 plus QuickPic-Kamera", Dec. 16, 2002, http://www.teltarif.de/arch/2002/kw51/s9498.html.

IBM Corp., "User Interface Shortcut", IBM Technical Disclosure Bulletin, vol. 33, No. 3A, Aug. 1990.

NTT DoCoMo, Inc., "DoJa 1.5 Overseas Edition DoJa Java Content Developer's Guide", Nov. 22, 2002 cument.

U.S. Appl. No. 10/557,241, filed Nov. 16, 2005, Otaka.

* cited by examiner

MOBILE COMMUNICATION TERMINAL

TECHNICAL FIELD

The present invention relates to a mobile communication terminal, such as a mobile phone, having a function of executing an application program registered by a user.

BACKGROUND ART

Conventionally, as this type of a mobile communication terminal, a mobile phone is known that is capable of executing an application program written in a platform-independent, object-oriented programming language (see Patent Document 1, for example). For example, a mobile phone is known that is provided with JAVA (registered trademark) virtual machine functionality so as to be able to execute an application program written in JAVA (registered trademark). In such a mobile phone, a user downloads his/her desired application program from a server in a mobile communication network and registers the application program on the mobile phone. Then, by the user starting the registered application program, the user can allow a standby screen composed of a three-dimensional moving image to be displayed on a display of the mobile phone, or can play a game, perform fortune-telling, or play music on the mobile phone.

Patent Document 1: Japanese Unexamined Patent Application Publication No. 2000-347867

DISCLOSURE OF THE INVENTION

Problems to be Solved by the Invention

In the aforementioned conventional mobile phone, when execution of the application program is terminated or when the execution is suspended, a standby screen is displayed on the mobile phone. Therefore, when the user uses a function of a mobile phone e-mail, a WEB browser, a function setting (F menu), or the like, upon suspension of the application program, the user needs to perform an operation to make a transition from the standby screen to the initial screen of a target function that the user desires.

Depending on the type of the application program, a situation may arise where it is expected that immediately after suspension of execution of the application program the user uses a certain function. For example, when a messaging application program that performs information exchange with another user, or the like, is executed, the user may want to suspend the application program and register a phone number or an e-mail address of the person with whom the user is exchanging information. In this case, after the suspension, the user allows the initial screen of a memory dial register function to be displayed, and then registers the phone number or e-mail address of the person with whom the user is exchanging information. However, in the conventional mobile phone, as described above, immediately after suspension of an application program, a standby screen is displayed, and thus, the user needs to perform an operation to make a transition from the standby screen to the initial screen of a memory dial register function.

As described above, the conventional mobile phone has a problem in that upon suspension of execution of an application program the user cannot promptly use a function that he/she requires, resulting in poor operability.

The present invention is made in view of the foregoing problem. An object of the present invention is to provide a mobile communication terminal whose operability is improved by enabling a user to promptly use a function that the user requires, upon suspension of execution of an application program.

Means for Solving the Problems

In order to attain the aforementioned object, a first mobile communication terminal according to the present invention comprises: image displaying means for displaying an image; control means for controlling the image displaying means; and application program executing means for executing an application program registered by a user, wherein the application program executing means sends a function transition request instruction to make a transition to a function specified by the application program, to the control means, upon suspension of execution of the application program, and the control means controls the image displaying means to display one of an initial screen of the function and a menu screen for selecting the function, based on the function transition request instruction.

In the mobile communication terminal, the application program executing means sends a function transition request instruction to make a transition to a function specified by the application program, to the control means, upon suspension of execution of an application program. Based on the function transition request instruction sent from the application program executing means, the control means controls the image displaying means and displays an initial screen of the function specified by the application program. When there are a plurality of specified functions, a shortcut menu screen for selecting a function is displayed. Here, at least one function that is likely to be required by the user upon suspension can be specified in the application program, and thus, the user can promptly use a function that he/she requires on the screen, upon suspension of execution of the application program.

A second mobile communication terminal according to the present invention comprises: image displaying means for displaying an image; control means for controlling the image displaying means; and application program executing means for executing a application program in accordance with setting data in property information associated with the application program registered by a user, wherein the property information includes control data for suspension that specifies a function to which a transition is made upon suspension of execution of the application program, the application program executing means sends a function transition request instruction to make a transition to the function specified by the control data for suspension, to the control means, upon suspension of execution of the application program, and the control means controls the image displaying means to display one of an initial screen of the function and a menu screen for selecting the function, based on the function transition request instruction.

In the mobile communication terminal, property information associated with an application program executed by the application program executing means includes control data for suspension that specifies a function to be activated upon suspension of execution of the application program. The application program executing means sends a function transition request instruction to make a transition to the function specified by the control data for suspension included in the property information, to the control means, upon suspension of execution of the application program. Based on the function transition request instruction sent from the application program executing means, the control means controls the image displaying means and allows an initial screen of the function specified by the control data for suspension or a menu screen to be displayed. Here, in the control data for suspension in the property information functions that are likely to be required by the user upon suspension can be specified, and thus, the user can promptly use a function that he/she requires on the screen, upon the suspension of execution of the application program. In particular, since the property information is information that can be referred to by a user, the user can easily check the content of control data for suspension that specifies a function to be activated upon suspension of execution of an application program.

Note that the control data for suspension may be designed such that the data can be set by a user. In this case, the user can freely set a function that he/she wants to use upon suspension of execution of an application program.

A third mobile communication terminal according to the present invention comprises: image displaying means for displaying an image; control means for controlling the image displaying means; an application program executing means for executing an application program registered by a user; and an operating means used by the user to input control data for suspension that specifies a function to be activated upon suspension of execution of the application program, wherein the control means controls the image displaying means to display one of an initial screen of the function specified by the control data for suspension and a menu screen for selecting the function, upon suspension of execution of the application program.

In the mobile communication terminal, control data for suspension that specifies a function to be activated upon suspension of execution of an application program is inputted by the user operating the operating means. The control means controls the image displaying means based on the control data for suspension and allows an initial screen of the function specified by the control data for suspension or a menu screen to be displayed, upon suspension of execution of the application program. Accordingly, upon suspension of execution of the application program, the user can promptly use a function on the screen that he/she requires.

Note that the aforementioned "mobile communication terminals" include mobile phones of the PDC (Personal Digital Cellular) system, the GSM (Global System for Mobile Communications) system, the TIA (Telecommunication Industry Association) system, and the like, mobile phones standardized by IMT (International Mobile Telecommunication)-2000, mobile phones of the TD-SCDMA (MC: Multi Carrier) system which is one of the TD-SCDMA (Time Division Synchronous Code Division Multiple Access) systems, PHSs (Personal Handyphone Systems), and phones, such as car phones, that are capable of executing application programs. The "mobile communication terminals" also include, in addition to the aforementioned phones, mobile communication terminals with no phone functionality such as PDAs (Personal Digital Assistance).

Control and information processing on the mobile communication terminal can also be realized by allowing a computer provided to the mobile communication terminal to execute a predetermined program. Receiving and passing of a program used on the computer may be performed using a recording medium, such as an FD or a CD-ROM, having recorded thereon a program as digital information, or may be performed using a communication network such as a computer network.

Effect of the Invention

According to the present invention, upon suspension of execution of an application program an initial screen of the specified function or a menu screen can be displayed, and thus, upon suspension of execution of the application program the user can promptly use a function on the screen that he/she requires, providing an advantageous effect that the operability can be improved.

BEST MODE FOR CARRYING OUT THE INVENTION

Embodiments in which the present invention is applied to a mobile phone serving as a mobile communication terminal will be explained below.

Figure 1:
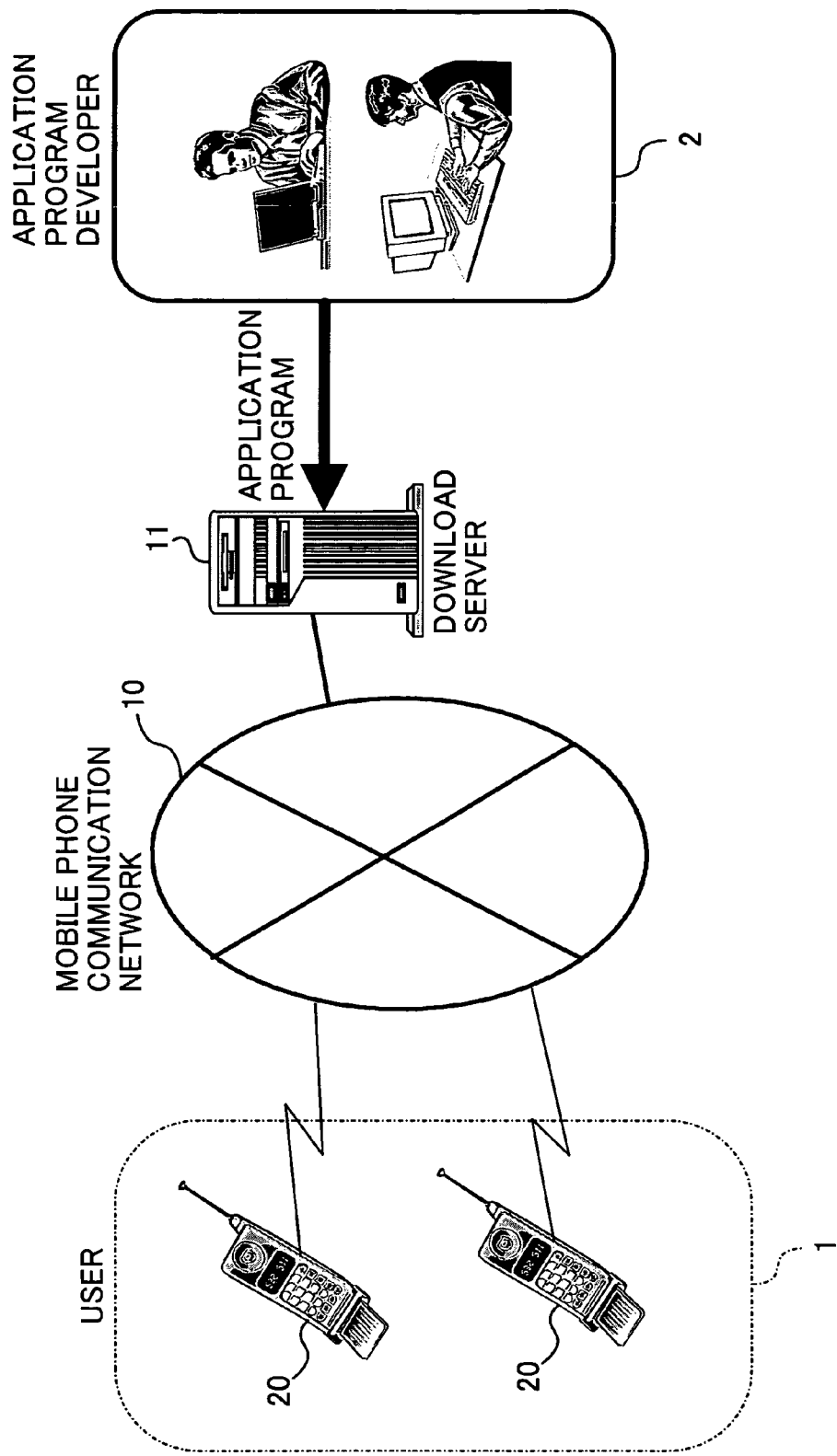
FIG. 1 is an illustrative diagram showing a main portion of a mobile communication system using a mobile phone according to an embodiment of the present invention.

FIG. 1 is an illustrative diagram showing a main portion of a mobile communication system using mobile phones 20 according to the present embodiment. In the mobile communication system, a mobile phone 20 used by a user 1 has a configuration capable of executing application programs developed by platform-independent object-oriented programming. Such application programs include those written in program languages such as JAVA (registered trademark), C, C++, and the like. The execution environment of such application programs can be constructed by middleware such as the virtual machine (VM: Virtual Machine) of JAVA (registered trademark) or BREW (registered trademark). The mobile phone 20 can be connected to a mobile phone communication network 10 serving as a communication network. To the mobile phone communication network 10 are connected an application program download server (hereinafter referred to as the "download server") 11 serving as a program providing server, and an information providing server, a location registering server, etc., which are not shown. Note that these servers may be configured as a single server. Note also that these servers may be configured as dedicated control devices having different configurations, or may be configured using a general-purpose computer system. Alternatively, each server may be configured using a single computer or may be configured by connecting, via a network, a plurality of computers each having a plurality of functions.

The download server 11 sends, upon receiving a download request from the mobile phone 20, an application program according to the request to the mobile phone 20. The Web server 12 sends, upon receiving a browse request from the mobile phone 20, a Web page screen which is a browse screen according to the request, to the mobile phone 20.

An application program to be provided from the download server 11 is provided from an application program developer 2. Specifically, for example, an application program is uploaded via a leased line or a public line to the download server 11 from a personal computer or the like on the side of the application program developer 2, and thereby the application program is provided. Note that an application program may be provided such that a recording medium, such as an optical disk or a magnetic disk, having recorded thereon a developed application program is sent from the application program developer 2 to a communication common carrier who manages and runs the download server 11 and then the application program on the recording medium is read by the download server 11. The application program thus provided is registered on the download server 11 in a state such that the mobile phone 20 can download the application program via the mobile phone communication network 10.

Figure 2:
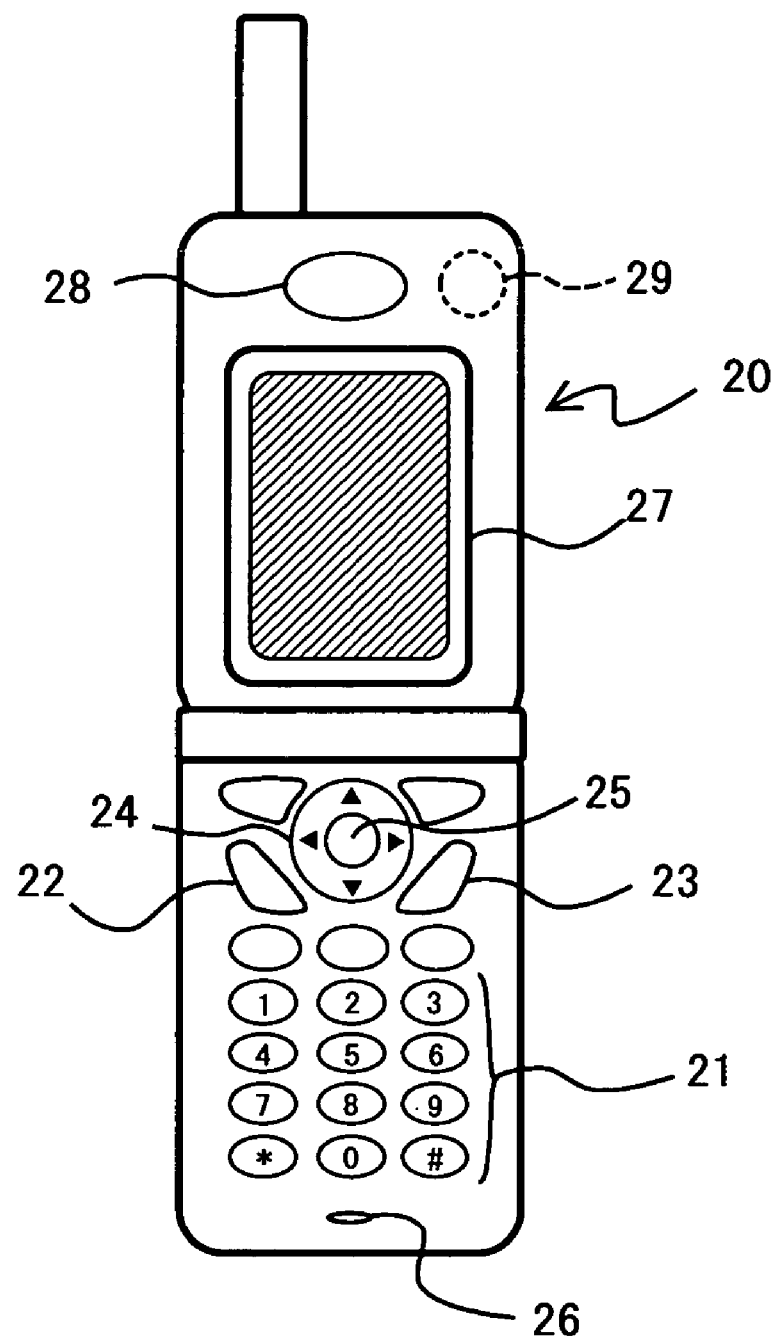
FIG. 2 is an external view of the mobile phone.
Figure 3:
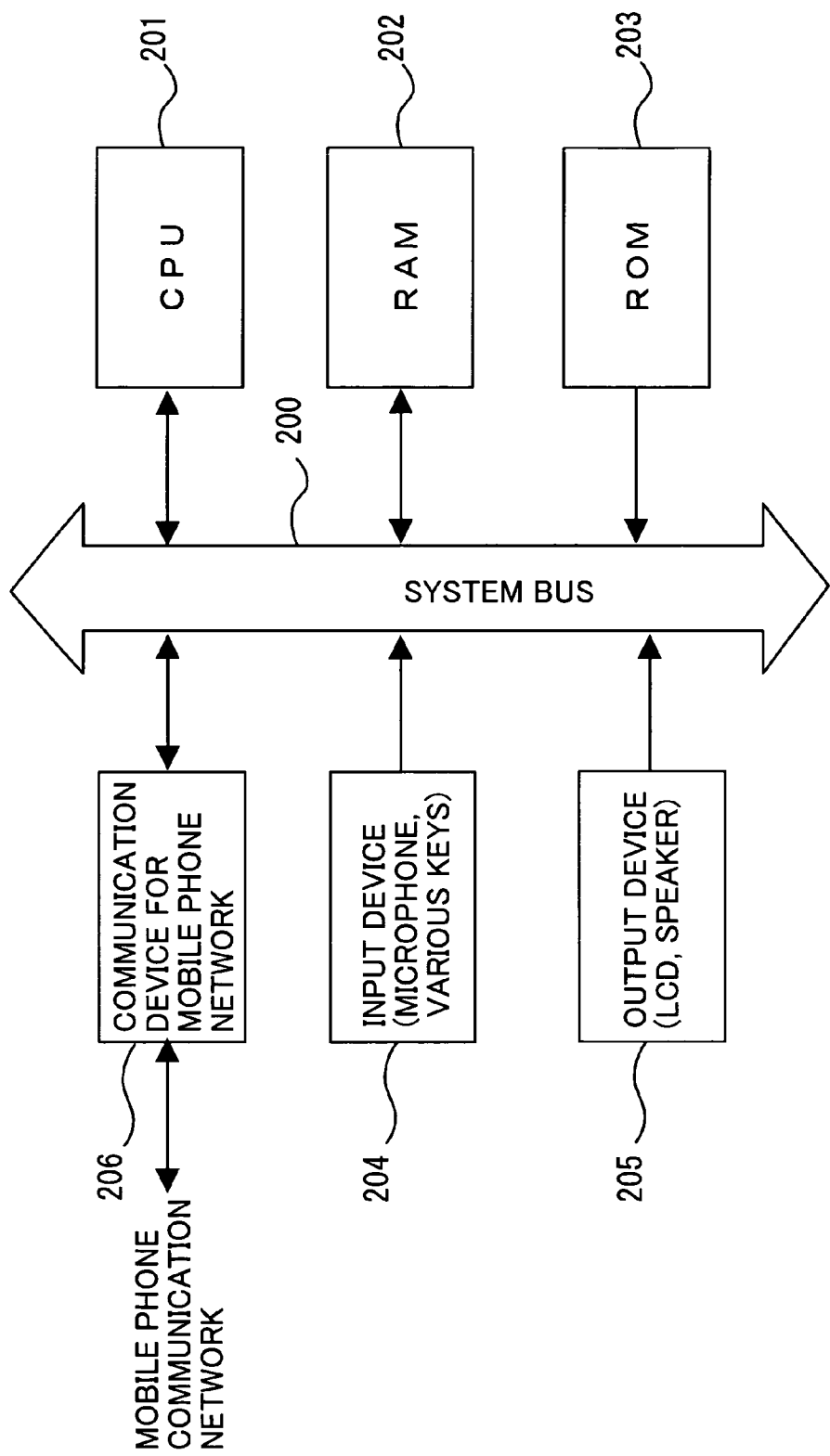
FIG. 3 is a schematic configuration diagram showing a hardware configuration of the mobile phone.

FIG. 2 is an external view of the mobile phone 20 and FIG. 3 is a schematic configuration diagram showing a hardware configuration of the mobile phone 20.

The mobile phone 20 is a clam-shell (folding) type mobile phone, and includes a system bus 200; a CPU 201; data memory means composed of RAM 202, ROM 203, and the like; an input device 204; an output device 205; and a communication device 206 for a mobile phone. The components such as the CPU 201 and the RAM 202 exchange with each other various data, instructions of a program which will be described later, etc., via the system bus 200. The input device 204 is composed of data entry keys (a numeric keypad, a * key, and a # key) 21, a call start key 22, a call end key 23, a scroll key 24, a multifunction key 25, a microphone 26, and the like. The output device 205 is composed of a liquid crystal display (LCD) 27 serving as an image display means, a speaker 28, and the like. The communication device 206 for a mobile phone establishes communication with other mobile phones or the aforementioned servers 11 and 12 via the mobile phone communication network 10.

Figure 4:
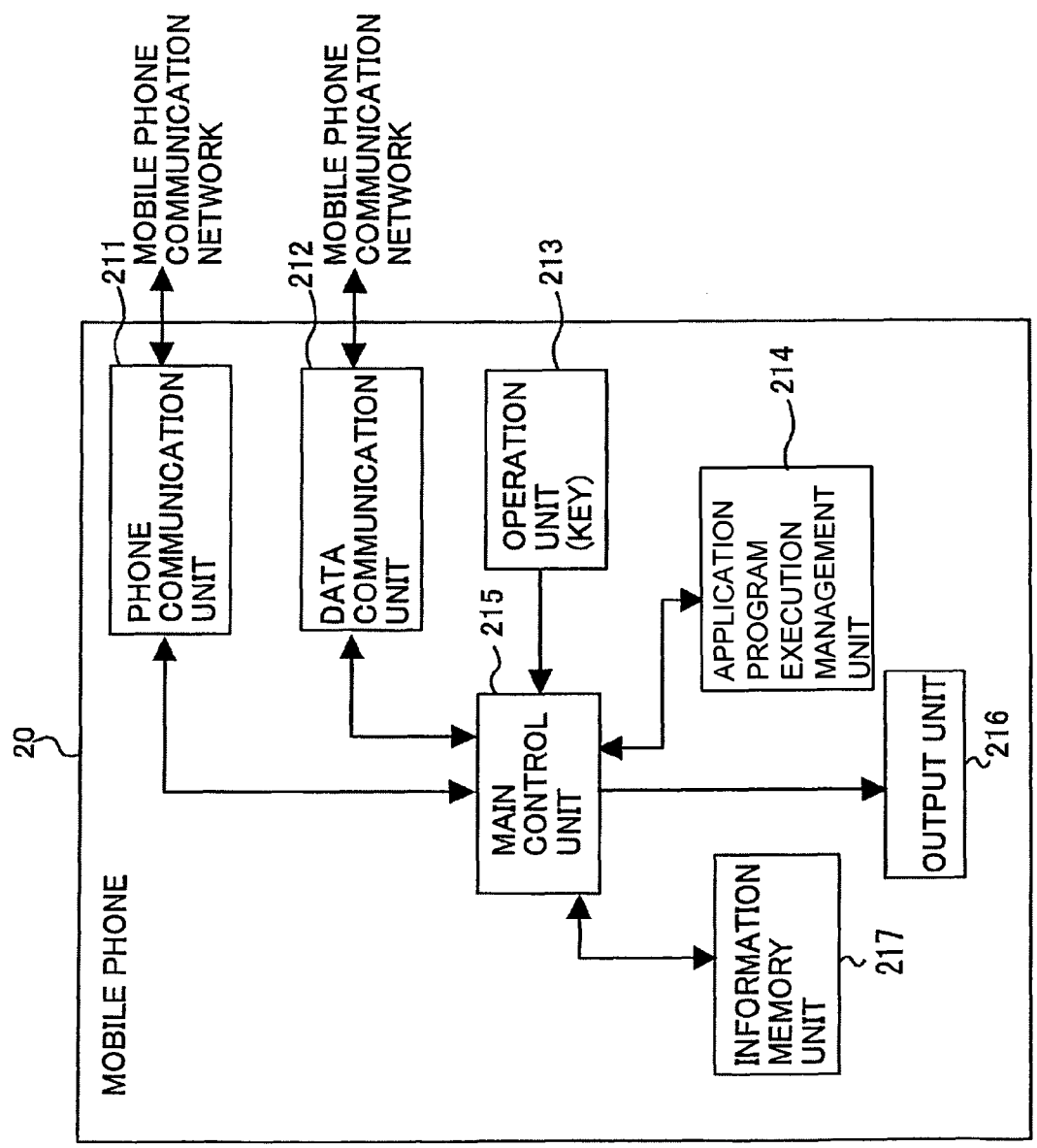
FIG. 4 is a block diagram showing an extracted main portion of the mobile phone.
Figure 5:
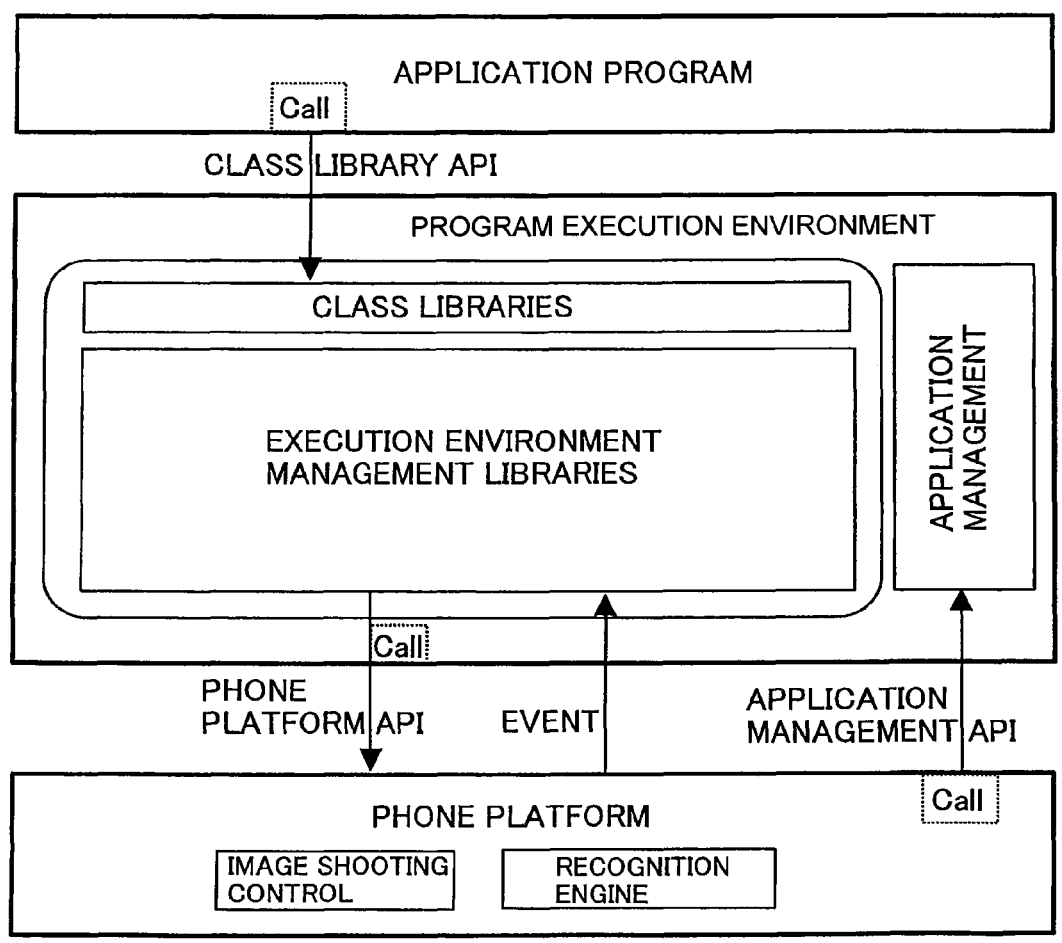
FIG. 5 is an illustrative diagram of a software structure to be executed on the mobile phone.

FIG. 4 is a block diagram showing an extracted main portion of the mobile phone 20 and FIG. 5 is an illustrative diagram of a software structure of the mobile phone 20.

The mobile phone 20 includes a phone communication unit 211, a data communication unit 212, an operating unit 213, an application program executing and managing unit 214 serving as an application program execution means, a main control unit 215 serving as a control means, and an output unit 216. In addition, the mobile phone 20 includes an information memory unit 217 serving as information memory means for storing various information received from the aforementioned information providing server 13.

The phone communication unit 211 performs radio communication with a base station of the mobile phone communication network 10 to perform phone communication with another mobile phone or a fixed-line phone. The phone communication unit 211 corresponds to the communication device 206 for a mobile phone, etc., in the aforementioned hardware configuration.

The data communication unit 212 corresponds to the communication device 206 for a mobile phone, etc., in the aforementioned hardware configuration, as in the phone communication unit 211. The data communication unit 212, for example, exchanges e-mails with other mobile phones via the mobile phone communication network 10, or establishes a connection to an external communication network, such as the Internet, from the mobile phone communication network 10 via a gateway server and exchanges e-mails on the Internet. The data communication unit 212 is also used to download, via the mobile phone communication network 10, an application program provided by the download server 11. In addition, the data communication unit 212 is also used as an information reception means for receiving distributed information including location information about the current location.

The operating unit 213 includes the numeric keypad 21, the call start key 22, the call end key 23, and the like, which can be operated by the user 1. By operating the operating unit 213, the user can input data, such as a URL, to the mobile phone 20, can start and end a call upon incoming call, or can select, start, and stop an application program. Further, by the user operating the operating unit 213, the user can download and register an application program from the download server 11, or can select and execute the registered application program. Moreover, by the user operating the operating unit 213, information received from the information providing server 13 in the mobile phone communication network 10 can be displayed.

The application program executing and managing unit 214 includes the system bus 200, the CPU 201, the RAM 202, and the like. The application program executing and managing unit 214 corresponds to the "program execution environment" shown in the center of the software structure in FIG. 5. The application program executing and managing unit 214 provides software, such as a class library, an execution environment management library, and an application management, which is used for an application program developed by object-oriented programming, and manages the execution environment of the application program.

The application program can call and use a class library of functions, etc. in the aforementioned program execution environment, via a class library API (application interface). The history of calling to the class library of functions, etc., is held until a virtual execution environment (virtual machine: VM) for the application program is terminated.

The execution environment management library in the program execution environment can call and use a phone platform library in a phone platform via a phone platform API, as will be described later.

The main control unit 215 controls the phone communication unit 211, the data communication unit 212, the operating unit 213, the application program executing and managing unit 214, the output unit 216, and the information memory unit 217. The main control unit 215 includes the system bus 200, the CPU 201, the RAM 202, and the like.

In addition, the main control unit 215 exchanges control instructions or various data with the application program executing and managing unit 214, the information memory unit 217, and the like, and performs control in cooperation with these units. The main control unit 215 corresponds to the "phone platform" shown at the bottom of the software structure in FIG. 5. The main control unit 215 executes a control program for controlling the phone communication unit 211 or the like, and a user interface, or provides a phone platform library. The phone platform can execute various processes in an application program by sending an event to the execution environment management library in the program execution environment, or can call, via an application management API, software of the application management in the program execution environment and use the software.

The output unit 216 includes, for example, the output device 205 composed of the liquid crystal display (LCD) 27, the speaker 28, and the like. The output unit 216 is used to display on the liquid crystal display (LCD) 17 a Web page screen received by the data communication unit 212, or to notify the user that incoming information is received by the phone communication unit 211 or the data communication unit 212. Specifically, when receiving such information, the main control unit 215 allows an incoming-information notification image to be displayed on the liquid crystal display (LCD) 17 of the output unit 216, or allows a ring tone to be outputted from the speaker 18. The output unit 216 is also used to provide, during the execution of an application program such as the aforementioned game, a display of an image or an output of sound which is related to the program execution. In addition, the output unit 216 is also used to display information received from the information providing server 13.

A control program for constructing a phone platform which allows the mobile phone 20 to operate in accordance with a predetermined procedure is memorized in the RAM 202 or the ROM 203. In addition, a basic OS (operating system) program, a program for constructing the program execution environment, and an application program are also memorized in the RAM 202 or the ROM 203. These programs are called, when necessary, in a work area of the CPU 201 or of the RAM 202 and executed.

In the mobile phone 20 having the aforementioned configuration, to download an application program from the download server 11, the user 1 operates the keys of the operating unit 213 to access the download server 11. By this operation, a download selection screen for selecting a downloadable application program is displayed on the display 17. Then, on the download selection screen, the user selects his/her desired application program using the scroll key 14, and presses the multifunction key 15, whereby the main control unit 215 controls the data communication unit 212, downloads the application program from the download server 11, and stores the application program in RAM 102 of the information memory unit 217.

Specifically, in the present embodiment 1, an application program consists of a JAD file (text data) that contains property information and a JAR file (binary data) that contains the main body of the program. The JAD file contains not only basic data such as an application name, an application version, an application's vendor name, and data of a URL indicating where the JAR file is stored, but also setting data indicating, for example, whether the application program is authenticated, whether the application program is used being connected to a network, or whether the application program is a resident application program. In addition, the JAD file also contains the URL (the address data of the distributor) of the official Web page where relevant information regarding the application program is disclosed. When the user's desired application program is selected on the download selection screen, the main control unit 215 controls the data communication unit 212, and first downloads only a JAD file in the application program. Thereafter, the main control unit 215 reads from the JAD file data of a URL indicating where a JAR file is stored, accesses the URL, and downloads the JAR file. The application program consisting of the JAD and JAR files thus downloaded is memorized in the RAM 102 of the information memory unit 217 by the main control unit 215.

When executing the application program thus downloaded, the user 1 operates the keys of the operating unit 213 to allow an application selection screen for selecting an application program to be executed to be displayed on the display 17. On the application selection screen, by the user selecting his/her desired application program using the scroll key 14, and pressing the multifunction key 15, the application program executing and managing unit 214 reads the JAR file and starts the application program. Here, if necessary, the setting data of the JAD file may be referred to and an environment that performs a processing operation in accordance with the setting data may be set. When a particular processing operation is performed during the execution of the application program, the setting data of the JAD file regarding the processing operation is referred to, and a processing operation suitable for the application program is performed. The application programs include various application programs; for example, an application program that allows a user to enjoy a game, etc., by operating various keys of the operating unit 213, and a resident application program that allows a standby screen composed of a three-dimensional moving image to be displayed on the display 17.

Now, the operation of a function transition upon suspension of execution of an application program will be described, which is the characteristics part of the present invention.

Figure 6:
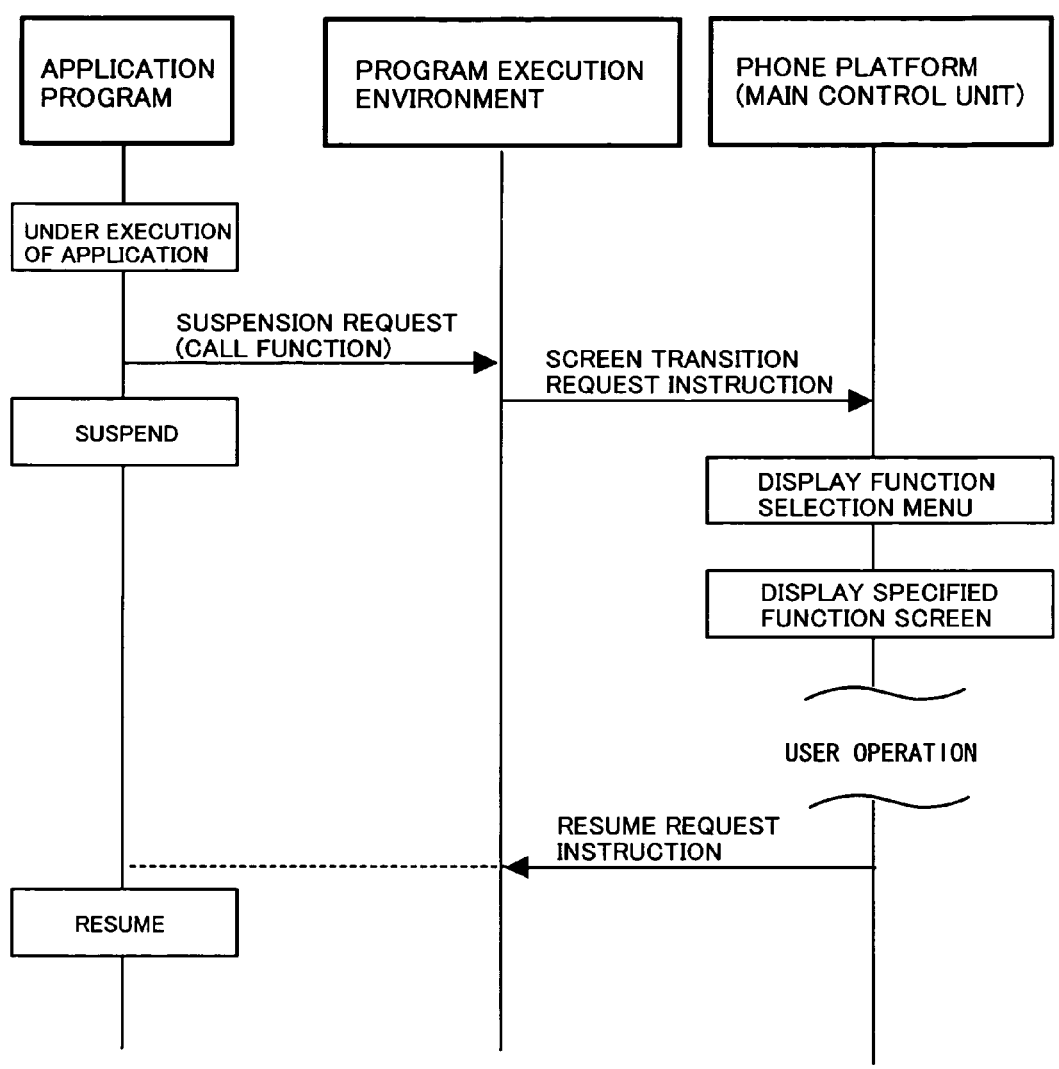
FIG. 6 is a sequence diagram showing a process performed when the mobile phone makes a transition to a function on a phone platform side upon suspension of execution of an application program.

FIG. 6 is a sequence diagram showing a process performed when a transition to a function on the phone platform side is made upon suspension of execution of an application program.

The user obtains an application program by downloading an application program from the download server 11, or by purchasing a mobile phone 20 in which the application program is registered in advance. The user can select his/her desired application program from an application program list and execute the selected application program.

When a transition to a particular function on the phone platform side is made during the execution of the application program, a command to request suspension that is called by a predetermined function for making a transition to the function is executed. The application program executing and managing unit 214 which constructs the application execution environment suspends the application program based on the command to request suspension, and outputs to the main control unit 215 on the platform side a screen transition request instruction serving as a function transition request instruction to make a transition to an initial screen of a function specified by the application program.

Figure 7A:
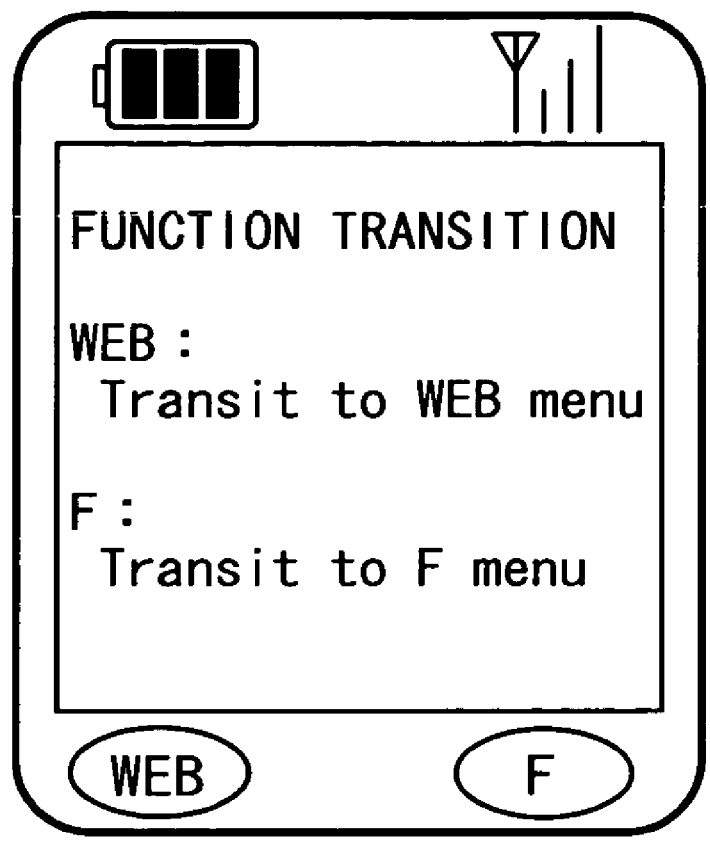
FIG. 7A is an illustrative diagram of a menu screen displayed upon suspension of execution of the application program.
Figure 7B:
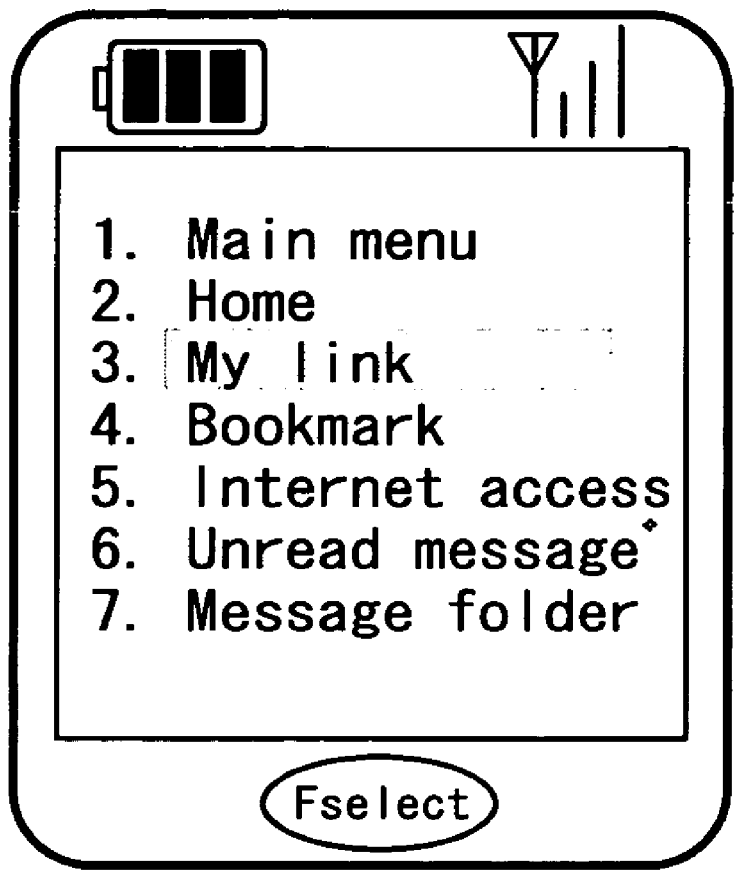
FIG. 7B is an illustrative diagram of an initial screen of a function selected on the menu screen of FIG. 7A.
Figure 7C:
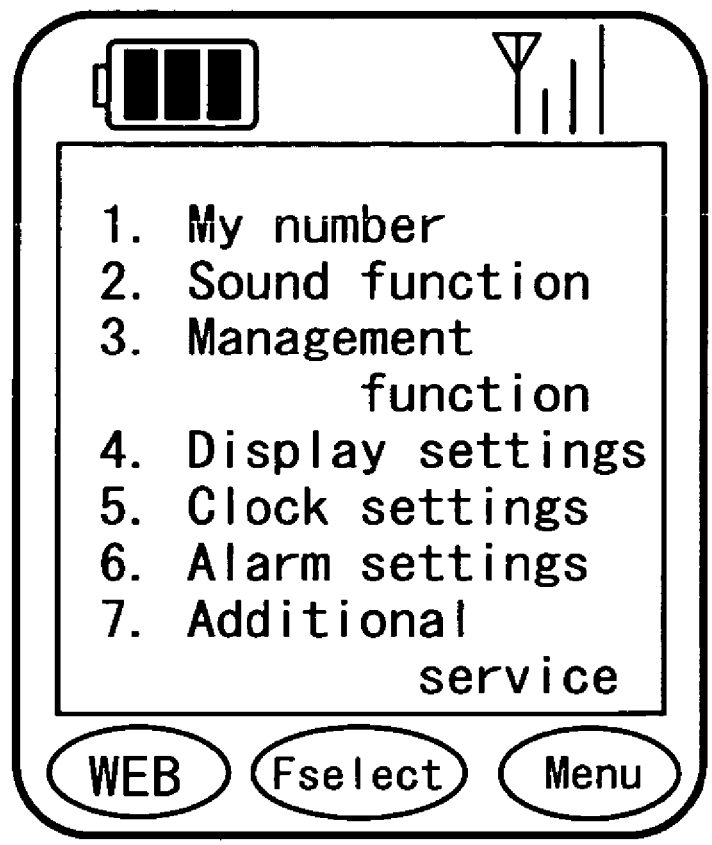
FIG. 7C is an illustrative diagram of an initial screen of another function selected on the menu screen of FIG. 7A.

The main control unit 215 having received the screen transition request instruction serving as the function transition request instruction controls the output unit 216 having the LCD 27 and allows a menu screen, such as the one exemplified in FIG. 7A, for shortcuts of a plurality of functions specified by the application program to be displayed. The user can select his/her desired function by looking at the menu screen. For example, when "WEB" is selected on the menu screen of FIG. 7A, a Web menu screen shown in FIG. 7B, which is the initial screen of a function of receiving various Web services, is displayed. When "F" is selected on the menu screen of FIG. 7A, an F-menu screen shown in FIG. 7C, which is the initial screen of a function of performing various settings, is displayed.

When the user performs an operation where the user uses various functions on the phone platform, and thereafter, performs an operation to resume the application program, a resume request instruction is outputted from the main control unit 215 to the application program executing and managing unit 214. The application program executing and managing unit 214 having received the resume request instruction resumes the suspended application program.

As described above, according to the present embodiment, in an application program functions that are likely to be required by a user upon suspension are specified, whereby upon suspension of execution of the application program a shortcut menu screen allowing the user to select a plurality of the specified functions can be displayed. Accordingly, upon suspension of execution of the application program, the user can promptly use a function on the screen that he/she requires, making it possible to improve operability.

In particular, the present embodiment is effective for the case where there are a plurality of functions that are likely to be activated upon suspension of an application program.

Figure 8:
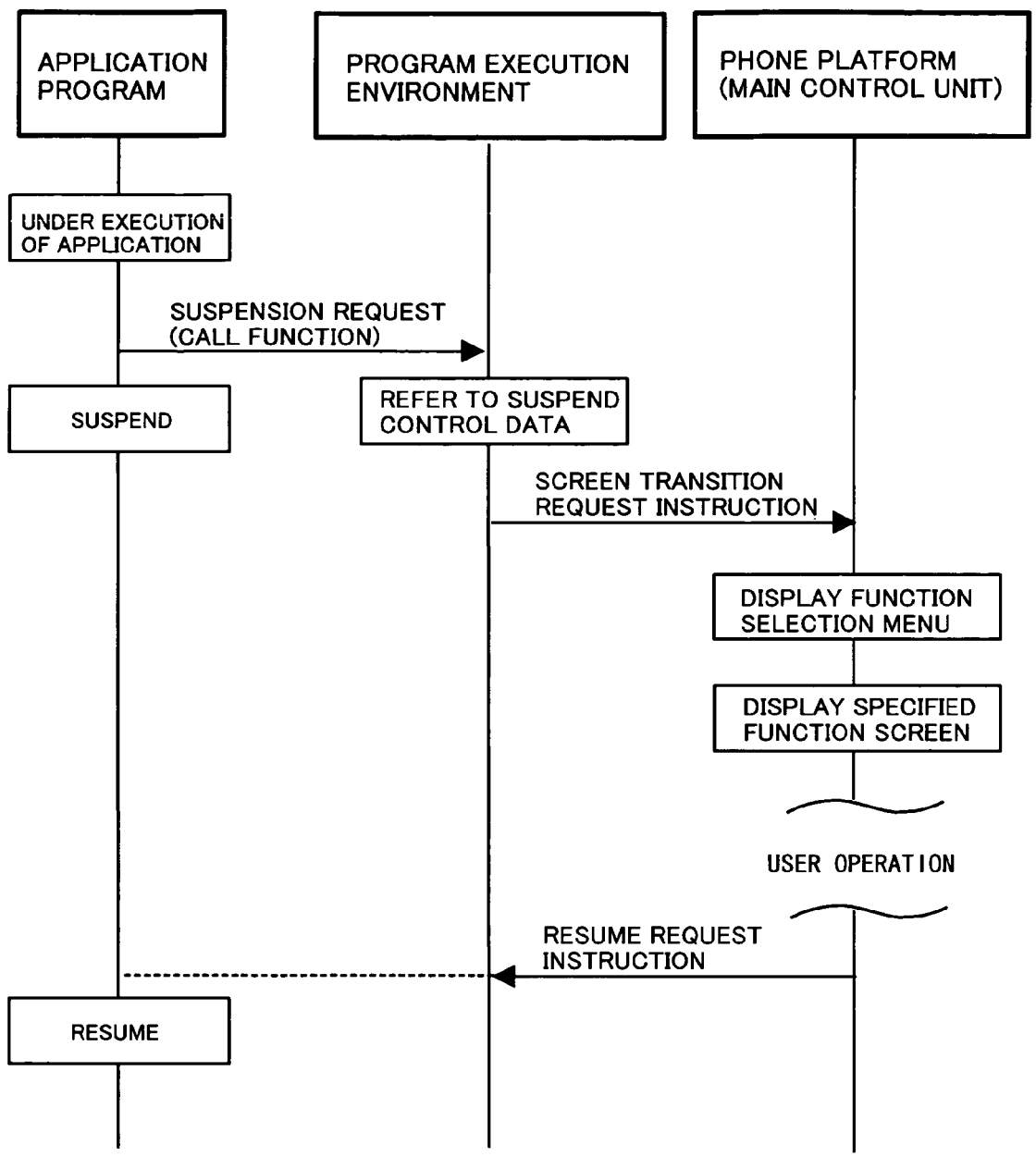
FIG. 8 is a sequence diagram showing a process performed when a mobile phone according to another embodiment makes a transition to a function on a phone platform side upon suspension of execution of an application program.

Although in the aforementioned embodiment a control is performed to make a transition to a function specified by an application program, control data for suspension regarding a transition destination upon suspension may be written as one of setting data in property information of an application program downloaded from the download server 11, and a transition to a function may be made using the control data for suspension. As shown in FIG. 8, the application program executing and managing unit 214 in this case refers to control data for suspension included in the property information, upon suspension of execution of an application program, and sends a screen transition request instruction serving as a function transition request instruction to make a transition to an initial screen of a function specified by the control data for suspension, to the main control unit 215. Based on the screen transition request instruction serving as the function transition request instruction sent from the application program executing and managing unit 214, the main control unit 215 controls the output unit 216 having the LCD 27, and allows the initial screen of the function specified by the control data for suspension or a shortcut menu screen to be displayed. Hence, in this case too, upon suspension of execution of the application program, the user can promptly use a function on the screen that he/she requires, making it possible to improve operability.

Alternatively, the control data for suspension in the property information of the application program may be designed such that the data can be modified by a user. In this case, the user operates the operating unit 213 having data entry keys (a numeric keypad, a * key, and a # key) 21 and the like and serving as operating means, to input control data for suspension. The main control unit 215 overwrites control data for suspension in the property information with the control data for suspension inputted by the user. By this control, the user can freely set a function that the user wants to use immediately after suspension of execution of an application program.

Figure 9:
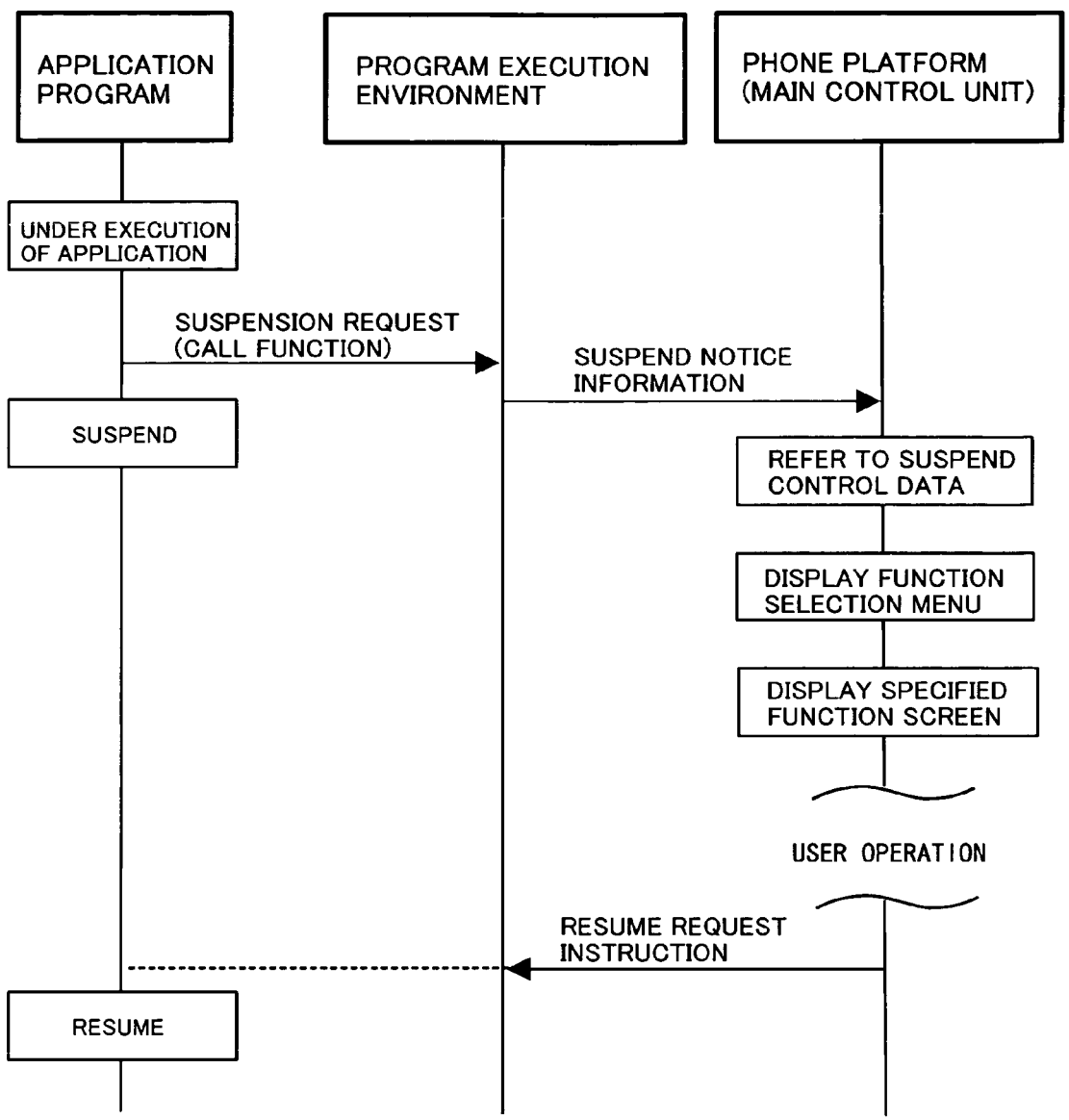
FIG. 9 is a sequence diagram showing a process performed when a mobile phone according to still another embodiment makes a transition to a function on a phone platform side upon suspension of execution of an application program.

Alternatively, in the aforementioned embodiment, a function transition upon suspension of execution of an application program may be controlled based on control data for suspension inputted by the user but not on a function transition request instruction sent from the application program executing and managing unit 214. As shown in FIG. 9, the main control unit 215 in this case receives suspension notification information from the application program executing and managing unit 214, upon suspension of execution of an application program, and thereafter, refers to control data for suspension in the information memory unit 217 which is inputted by the user operating the operating unit 213. Then, based on the control data for suspension, the main control unit 215 controls the output unit 216 having the LCD 27 and allows an initial screen of a function specified by the control data for suspension or a menu screen to be displayed. Accordingly, in this case too, upon suspension of execution of the application program, the user can promptly use a function on the screen that he/she requires.

Although, in the aforementioned embodiments shown in FIGS. 6, 8, and 9, upon suspension of execution of an application program a menu screen for selecting a plurality of the specified functions is displayed, when there is only a single specified function, the initial screen of that function may be directly displayed. In this case, the user can more promptly use a function that he/she requires.

Although the preferred embodiments of the present invention have been explained, it is understood that various modifications may be made to the embodiments disclosed herein without departing from the scope or spirit of the present invention, and within the scope of the technical ideas as set forth in the appended claims.

For example, although the aforementioned embodiments explain a mobile phone that can execute application programs developed by platform-independent object-oriented programming using a programming language such as JAVA (registered trademark), the present invention can be applied without being limited to the type of application program to be executed on the mobile phone, and the same advantageous effects can be obtained.

In addition, the present invention can be applied to any apparatus as long as the apparatus can execute application programs and can display images, and thus can be applied not only to phones, such as PHSs and car phones, but also to portable PDAs, and the same advantageous effects can be obtained.

The invention claimed is:

1. A mobile communication terminal, comprising:
   image displaying means for displaying an image;
   a main control unit for controlling said image displaying means; and
   application program executing means for executing an application program, wherein said application program executing means includes:
      means for receiving a command to suspend the execution of the application program;
      means for suspending the application program in response to the command;
      means for sending a function transition request instruction to make a transition to a function specified by the application program to the main control unit; and
      means for resuming the application program that is suspended upon receipt of a resume request instruction from the main control unit,
   wherein the main control unit includes:
      control means for controlling said image displaying means to display one of an initial screen of the function and a menu screen for selecting the function while the application program is suspended, based on the function transition request instruction; and
      means for outputting a resume request instruction to the application program executing means in response to performance of an operation to resume the application program.

2. The mobile communication terminal of claim 1, wherein the menu screen is a program shortcut menu.

3. The mobile communication terminal of claim 1, wherein the command to suspend includes control data which can be modified by a user.

4. The mobile communication terminal of claim 1, wherein the menu screen allows selection of a plurality of specified functions.

5. The mobile communication terminal of claim 4, wherein, when there is only a single specified function, the initial screen of the single specified function is directly displayed.

6. A method for operating a mobile terminal, comprising:
during execution of an application program, receiving a command to suspend the execution of an application program at a program executing means;
suspending the application program in response to the command;
sending a function transition request instruction to make a transition to a function specified by the application program to a control unit;
controlling an image displaying means to display one of an initial screen of the function and a menu screen for selecting the function, based on the function transition request instruction, at the control unit;
outputting a resume request instruction to the application program executing means in response to the performance of an operation to resume the application program; and
resuming the suspended application program on receipt of the resume request instruction.

7. The method of claim 6, wherein the menu screen is a program shortcut menu screen.

8. The method of claim 6, wherein the command to suspend includes control data which can be modified by a user.

9. The method of claim 6, wherein the menu screen allows selection of a plurality of specified functions.

10. The method of claim 9, wherein, when there is only a single specified function, the initial screen of the single specified function is directly displayed.

11. A mobile communication terminal, comprising:
an image display that displays an image;
a main control unit that controls the image display;
an application program executing unit that executes an application program, wherein said application program executing unit includes:
a command receiver unit that receives a command to suspend the execution of the application program;
an application program suspending unit that suspends the application program in response to the command;
an instruction sending unit that sends a function transition request instruction to make a transition to a function specified by the application program to the main control unit;
an application program resuming unit that resumes the suspended application program upon receipt of a resume request instruction from the main control unit,
wherein the main control unit includes:
a controller that controls that image display to display one of an initial screen of the function and a menu screen for selecting the function, based on the function transition request instruction; and
an output unit that outputs a resume request instruction to the application program executing unit in response to performance of an operation to resume the application program.

12. The mobile communication terminal of claim 11, wherein the menu screen is a program shortcut menu.

13. The mobile communication terminal of claim 11, wherein the command to suspend includes control data which can be modified by a user.

14. The mobile communication terminal of claim 11, wherein the menu screen allows selection of a plurality of specified functions.

15. The mobile communication terminal of claim 14, wherein, when there is only a single specified function, the initial screen of the single specified function is directly displayed.

* * * * *